United States Patent [19]

Ogren et al.

[11] 4,090,979

[45] May 23, 1978

[54] PROCESS FOR PRODUCING CHEMICAL PUMP ABSORBENTS FOR A CARTRIDGE COMBUSTION-DRIVEN CHEMICAL LASER

[75] Inventors: John R. Ogren, McLean; Gilbert J. Ogle, Vienna, both of Va.; Eugene V. Rutkowski, Rancho Palos Verdes, Calif.

[73] Assignee: The United States of America as represented by the Secretary of the Army, Washington, D.C.

[21] Appl. No.: 794,690

[22] Filed: May 6, 1977

[51] Int. Cl.$^2$ .................. B01J 23/02; B01J 23/04; B01J 27/10
[52] U.S. Cl. ................... 252/441; 252/475; 252/476
[58] Field of Search .............. 252/475, 476, 441; 55/74; 75/.5 R, 108

[56] References Cited

U.S. PATENT DOCUMENTS 3,976,447   8/1976   Merchant et al. .............. 55/74 X Primary Examiner—W. J. Shine
Attorney, Agent, or Firm—Nathan Edelberg; Robert P. Gibson; James T. Deaton

[57] ABSTRACT

A process for producing improved chemical laser absorbent materials by precipitating the chemical laser absorbent materials of metal from liquid anhydrous ammonia at very low temperature to produce an absorbent material that has a high surface area and when desired to deposit the chemical absorbent material on a substrate material in the process of precipitating the absorbent material from the liquid ammonia. The chemical metal absorbent material is adapted for containment of the effluent gases from a chemical laser and the substrate when used absorbs the heat of reaction.

8 Claims, 3 Drawing Figures

PROCESS FOR PRODUCING CHEMICAL PUMP ABSORBENTS FOR A CARTRIDGE COMBUSTION-DRIVEN CHEMICAL LASER

DEDICATORY CLAUSE

The invention described herein was made under contract with the Government and may be manufactured, used, and licensed by or for the Government for governmental purposes without the payment to us of any royalties thereon.

BACKGROUND OF THE INVENTION

In the past, the problem of containment of effluent gases from a combustion-driven chemical cartridge laser has existed. Such gases are high temperature, sub-atmospheric pressure mixtures which can contain any of the following molecular spheres: HF, DF, $H_2$, $D_2$ (D = deuterium), $N_2$, $O_2$, $Cl_2$ and $Br_2$. A particular aspect of the cartridge laser to which this invention is addressed is that the effluent gas flow rate is high for a brief time duration when the laser is operated in a pulsed mode. In the past, two techniques have been used for gas containment in laser systems. These have included (1) a multi-stage unit which employed: a cold condenser tube which removed HF and DF, a cryogenic ($-195°$ C) molecular sieve bed which removed $N_2$ by physical absorption, and a high temperature (400° C) titanium powder bed which removed $H_2$ and/or $D_2$ by chemical reaction, and (2) a high temperature bed of all-metal filings with relatively low surface area to react with all the gases. In one instance of the all-metal high temperature bed, calcium-10% magnesium alloy filings were used at 500° C, and in another case, a duo-temperature titanium bed of coarse filings was employed; one portion at 400°–500° C to react with $H_2$, $D_2$, HF, DF, and another portion at 900° C to react with $N_2$.

Also, in the past a bed of graphite (activated charcoal) and variations of soda-lime have been employed for removal of HF from gas streams. Such beds have low capacity or require extensive, bulky auxilliary equipment (cyclone precipitators) and are not favorable for pulse laser systems because the quantity of absorbent needed for realistic laser power operation is very high.

Therefore, it is an object of this invention to provide a process for producing reactive metals of high surface area that readily react with and absorb the effluent gases from a combustion-driven chemical cartridge laser.

Another object of this invention is to provide reactive metals that can be deposited on a substrate for a heat-absorbing function by absorbing heat (enthalpy) released during chemical reactions.

Other objects and advantages of this invention will be obvious to those skilled in this art.

SUMMARY OF THE INVENTION

In accordance with this invention, a process for producing high surface area reactive metals is provided that includes placing the metal that is to be precipitated into a reaction vessel, lowering the temperature of the metal in the container to liquid nitrogen temperature, dissolving the metal in anhydrous ammonia at the cooled temperature, and distilling off the ammonia at low temperature between about 0° C and $-35°$ C to produce a reactive metal that is precipitated out as the ammonia is distilled off. Also, in some applications it is desirous to precipitate the reactive metal or metals onto a substrate material for absorbing heat from chemical reactions. In this case, a substrate is used that is not dissolvable in ammonia and as the metal precipitates, it precipitates onto the substrate material. This process is useful in the preparation of such metals is lithium, sodium, potassium, calcium, magnesium, other metals, and combinations of the various metals. All the metals must be of the type that will dissolve, without chemicals reaction, in liquid ammonia.

DESCRIPTION OF THE PREFERRED EMBODIMENT

Figure 1:
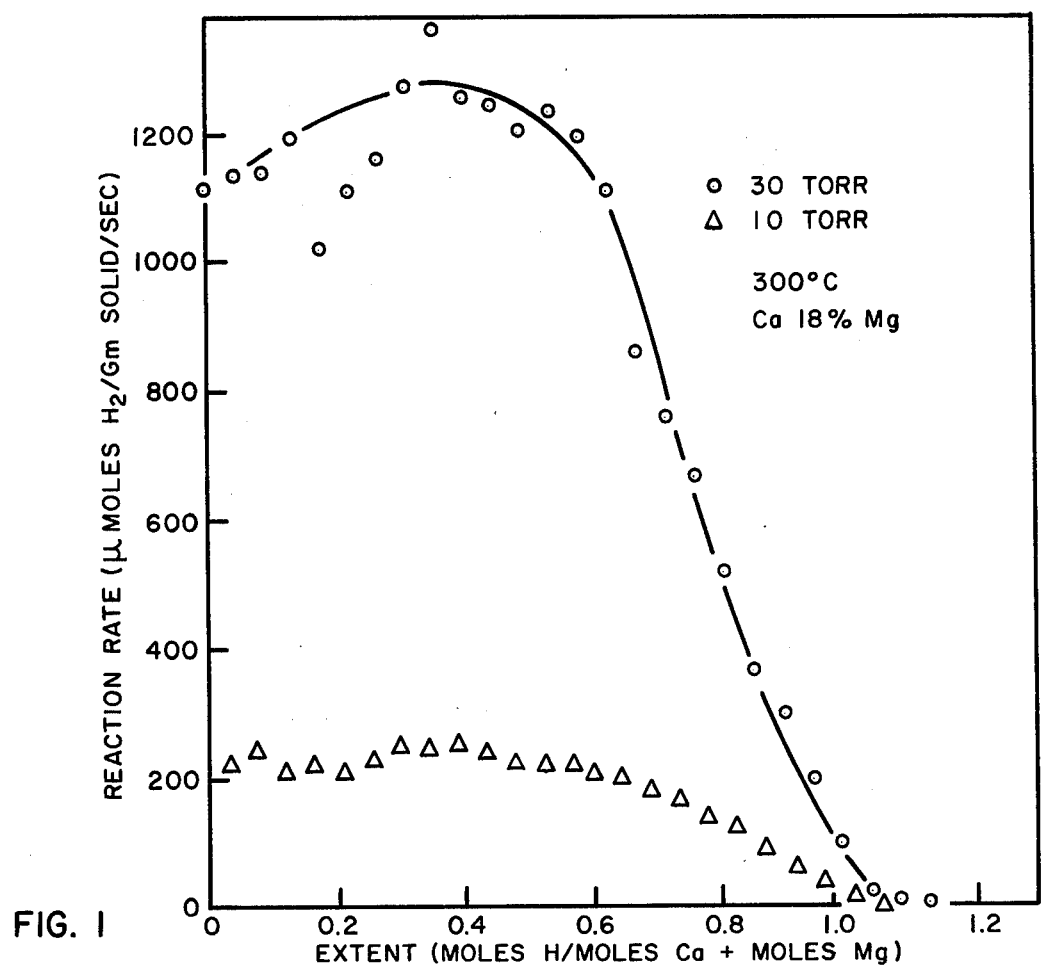
FIG. 1 is a rate-capacity curve for the reaction between hydrogen and Ca-18% Mg at 300° C.

This invention involves the precipitation of reactive metals from anhydrous ammonia at cryogenic temperatures and results in materials which have much higher specific surface areas than that achievable by other processes such as mechanical processes. The process also results in a material which is not degraded due to contamination with gases generated during the process.

The process involves charging a reaction vessel with a selected metal or metals in granules, evacuating the reaction vessel, cooling the reaction vessel using liquid nitrogen to a temperature between about $-30°$ C and $-35°$ C, adding anhydrous ammonia to the container with the metal or metals in granules, mixing the ingredients to cause the granules to go into solution, allowing the reaction vessel to warm to a temperature less than 0° C and then evacuating the reaction vessel by distilling off the ammonia and leaving the metal as a precipitate. The metal precipitate can then be processed as desired. Also, if it is desired to deposit the metal on a substrate material, a substrate is used that will not dissolve in the ammonia and as the metal precipitates out, it precipitates onto the substrate material. Metals that are dissolvable in liquid ammonia in accordance with this process include lithium, sodium, potassium, calcium, magnesium, other metals that will dissolve in liquid ammonia, and mixtures of the various metals. Examples of substrates that can be used are potassium chloride, ceramic oxides, inorganic salts and mixtures thereof, metals and alloys.

The steps of the process are illustrated in the formula set forth herein below:

| SOLUTION STEP |
| --- |
| 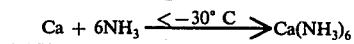 |
| DISSOCIATION STEP |
| 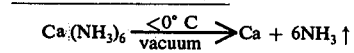 |
| COMPETING REACTION |
| 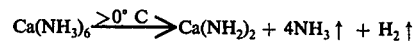 |

As can be seen, this invention employs a system of materials in which the reactive metal performs a chemical absorption function by combining with the laser gas stream to form solid reaction product. When the substrate is used, it will perform a heat-absorbing function by absorbing the heat (enthalpy) released during the chemical reactions.

In order to fully understand the salient features of this invention, certain specific examples with the understanding that the scope of this invention is not limited to the specific examples is set forth hereinbelow.

EXAMPLE I

First described is a process that is useful for the preparation of high surface area reactive metals. This process involves precipitation of a metal from cryogenic anhydrous ammonia as set forth hereinabove. The process is useful in the preparation of lithium, sodium, potassium, calcium, magnesium and other metals that will dissolve, without chemical reaction, in liquid ammonia. Table I hereinbelow contains reaction rate data for several such materials with the gas that is most difficult to chemically react, namely nitrogen. The numbers in the table represent averages of several experiments and illustrate four major points:

(1) The reaction rates for calcium and Ca-18% Mg prior art coarse filings are equal to those for commercial titanium but occur at much lower temperatures. The 630°-670° C values are acceptable from a total laser standpoint whereas the 740° C values for titanium are not.

(2) Calcium and Ca-18% Mg made by precipitation from ammonia according to this invention react far faster than calcium filings. Thus, the ammonia process is beneficial.

(3) It is not necessary to pre-alloy the calcium and magnesium. For all practical purposes, adequate reaction reates were obtained from a precipitated Ca-Mg material that had not been pre-alloyed when made in accordance with the process herein.

(4) High surface area lithium reacted at room temperature at a rate 5 times faster than titanium at 900° C.

The practical benefits from the first example are manifold. The data shows that a simple process, namely precipitation of high surface area metal from anhydrous ammonia can be used to prepare a reactive metal which will chemically pump the most inert specie from a laser at a good rate. The data for lithium are of prime importance because no other possible chemical absorbent can have a lower atomic weight; thus, from a chemical stoichiometric viewpoint, a view that quantitatively defines the upper most boundary to chemical pump performance, lithium is the optimal material.

The data in Table I shows that lithium will react with nitrogen at room temperature.

The data in Table I is for samples precipitated directly from solution. The following example concerns the situation where the metal is precipitated on a substrate or support material.

EXAMPLE II

In this example, calcium was precipitated from anhydrous solution in the presence of powdered KCl. The specific reaction rate with nitrogen, based on the quantity of calcium was 5 $\mu$moles $N_2$/g(Ca).sec.torr at 400° C. This experiment was conducted under circumstances in which the reactivity of unsupported calcium with nitrogen was 11 $\mu$moles $N_2$/g(Ca).sec.torr under the same experimental conditions. Thus, the supported calcium reactivity was only slightly degraded by the presence of KCl and it is easy to find ways to improve this reactivity.

The consequences of this example are important. A composite materials system can be realized in which any reactive metal, soluble in ammonia, can be precipitated on a support material. The primary properties needed for the support material are:

1. It must be insoluble in anhydrous ammonia.
2. It must be capable of being pulverized to a moderate high surface area.
3. It should have a high heat capacity to absorb heat. This requirement recognizes that the total effective capacity to absorb heat has two contributions:

(a) Specific heat, Cp in cal/mole degree, and
 (b) Heat of transformation, transition, phase change.

Thus, the melting temperature of the support material can be used to absorb the heat (at constant temperature).

4. It should have a melting temperature at a value

TABLE I.
CHEMICAL ABSORPTION RATES FOR NITROGEN GAS

| Material And Method Of Preparation | Experientially Determined Specific Reaction Rates ($\mu$moles/g . sec . torr) At Indicated Temperature |
|---|---|
| Titanium Powder, −150 + 325 Mesh (>40$\mu$) Commerially Available | 0.6 at ~900° C |
| Titanium Powder, 1-3$\mu$ particle size Commercially Available | 10 at 740° C, negligible below that temperature |
| Calcium Filings, approximately 100 Mesh | 10 at 670° C |
| Ca-18% Mg Filings, approximately 100 Mesh | 9 at 630° C |
| Calcium precipitated from anhydrous ammonia | 64 at 400° C; reaction starts at 310° C |
| Calcium - 18% magnesium (pre-alloy) precipitated from anhydrous ammonia | 52 at 400° C; reaction starts at 100° C |
| Calcium - 18% Magnesium precipitated from anhydrous ammonia. The Ca—Mg combination was not pre-alloyed in this case before being dissolved in ammonia. | 40 at 400° C; reaction starts at 100° C |
| Lithium precipitated from anhydrous ammonia. | 3 at room temperature | suitable as a "safety limit". In other words, if the heat of chemical reaction should cause local areas to run away and pose a hazard, it can be arranged to have the support material melt and quickly inactivate the reactive chemical surface.

5. It must be stable and not evolve gases under vacuum that could degrade the reactive metal.

Substrate support materials can be used from many general classes of materials including ceramic oxides, inorganic salts and mixtures thereof, metals and alloys.

The use of a support material to store the heat of reaction from the chemical absorption reactions is attractive from an overall chemical cartridge concept because it is difficult to remove the heat of reaction by heat transfer through a high surface area material. On the other hand, it is far more easy to transfer the same quantity of heat from the surface of each particle through the metallic thin deposit to the support material immediately beneath it.

In the next two examples we cite data to show reactivity with other laser effluent gases.

EXAMPLE III

Figure 2:
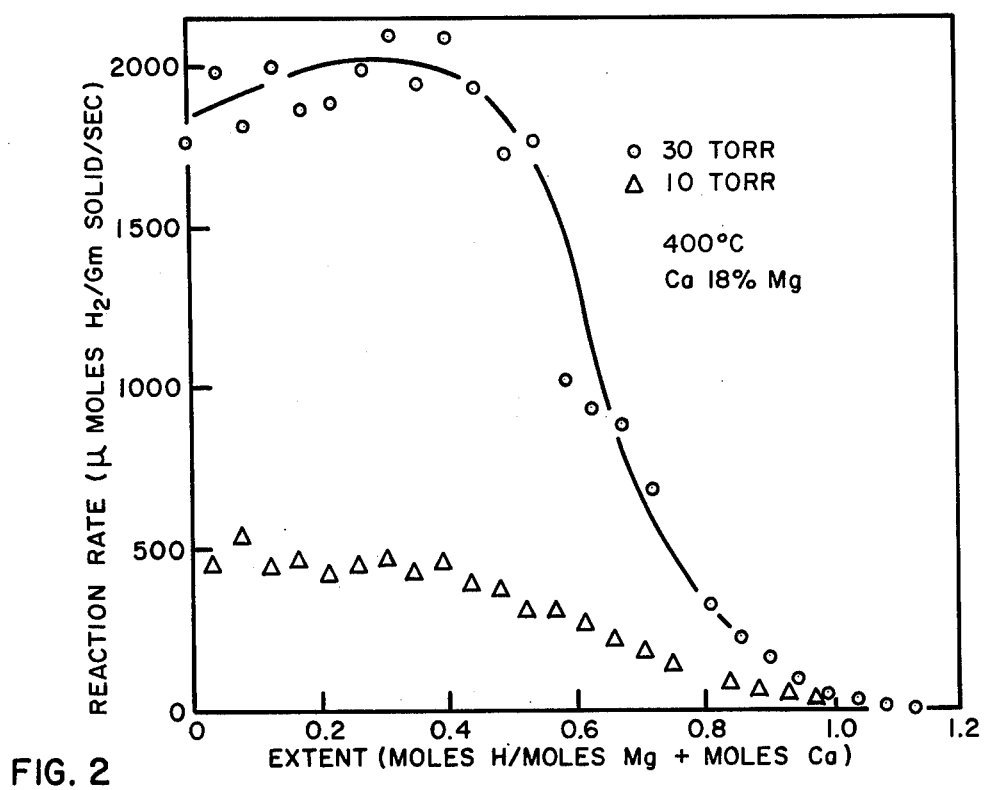
FIG. 2 is a rate-capacity curve for the reaction between hydrogen and Ca-18% Mg at 400° C as illustrated.

FIGS. 1 and 2 of the drawings depict rate-capacity data for the reaction between Ca-18% Mg and a second laser effluent gas, hydrogen. The alloy in this case was precipitated from ammonia. The specific rate at 400° C is 67 $\mu$moles $H_2$/g.sec.torr and is several fold higher than that for titanium.

EXAMPLE IV

Figure 3:
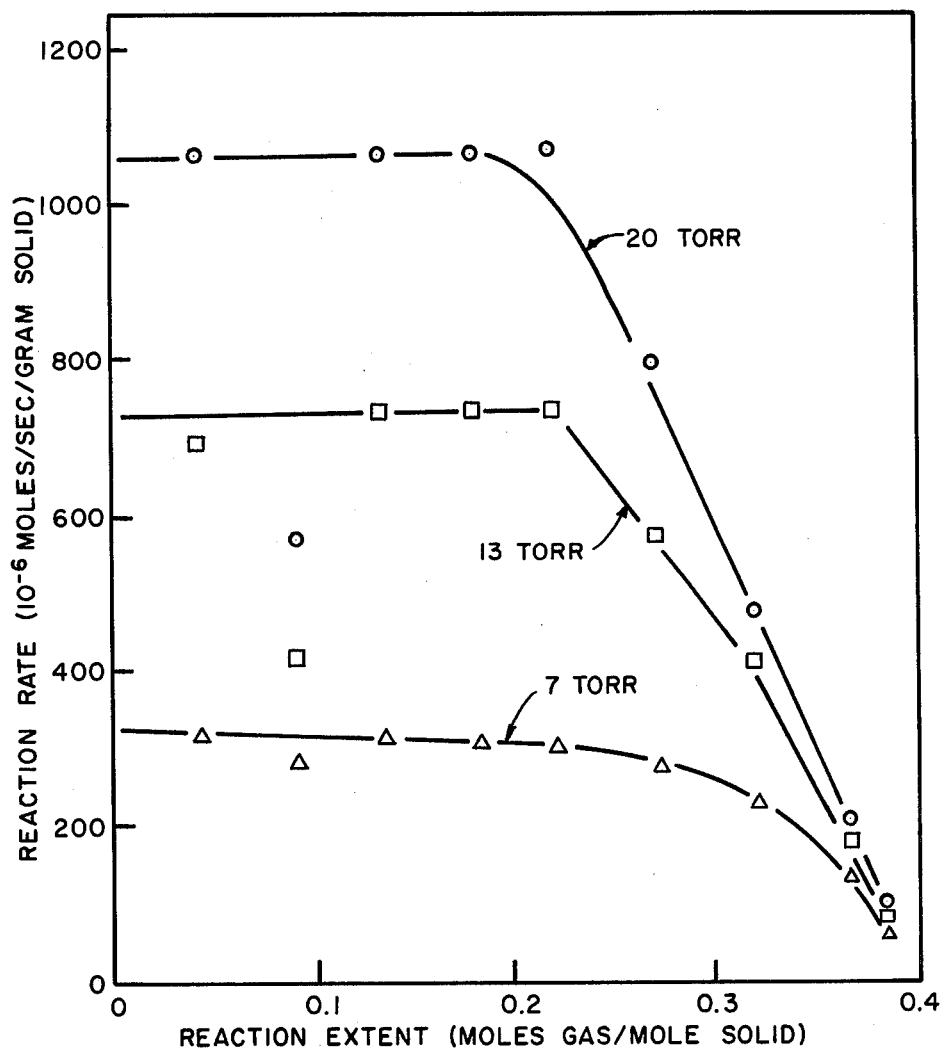
FIG. 3 is curves which illustrate the reaction kinetics of HF-(Ca-10% Mg) reaction at 500° C and 7, 13, 20 torr for material of particles size distribution in Table I referenced herein below.

FIG. 3 of the drawings depicts rate-capacity data for the reaction between another laser gas, HF and Ca-18% Mg alloy. The alloy was not precipitated from ammonia in this case and this illustrates that the intrinsic reactivity of Ca-18% Mg for HF is very high.

It is clear from the examples that we have found both a class of materials and a process for their preparation which results in significantly improved chemical absorbents for containment of the effluent gases from a chemical laser.

As can be seen, this process involves the precipitation of reactive metals from anhydrous ammonia at cryogenic temperatures and results in materials which have much higher specific surface areas than that achievable by other processes such as mechanical processes. The process also results in a material which is not degraded due to contamination with gases generated during the process. All operations are in liquid ammonia at temperatures between 0° C and −33.6° C. At higher temperatures the reactive material is maintained in a vacuum of $10^{-3}$ torr or better or in an inert gas of equivalent purity.

We claim:

1. A process for producing improved chemical absorbent materials, comprising precipitating metal that is dissolvable in anhydrous ammonia at liquid nitrogen temperature from a solution of the metal and anhydrous ammonia that is cooled to low temperature to form a precipitated metal of high surface area when the anhydrous ammonia is distilled off.

2. A process for producing improved chemcial absorbent material as set forth in claim 1, wherein said solution is cooled to a temperature between about −30° C and about −35° C before said anhydrous ammonia is distilled off.

3. A process for producing improved chemical absorbent material as set forth in claim 2, wherein said metal is selected from the group consisting of lithium, sodium, potassium, calcium, magnesium and mixtures thereof.

4. A process for producing improved chemical absorbent material as set forth in claim 3, wherein said anhydrous ammonia is distilled off at less than 0° C.

5. A process for producing improved chemical absorbent material as set forth in claim 3, wherein said metal is precipitated onto a substrate material.

6. A process for producing improved chemical absorbent material as set forth in claim 5, wherein said substrate material is selected from the group consisting of potassium chloride, ceramic oxides and inorganic salts and mixtures thereof, metals and alloys that are not dissolvable in anhydrous liquid ammonia.

7. A process as set forth in claim 4, wherein said chemical absorbent material is used as a chemical pump for a chemical laser.

8. A process as set forth in claim 6, wherein said chemical absorbent material and said substrate are used as a chemical pump for a chemical laser.

* * * * *